US012539275B2

(12) United States Patent
Jeong et al.

(10) Patent No.: US 12,539,275 B2
(45) Date of Patent: Feb. 3, 2026

(54) COSMETIC COMPOSITION CONTAINING GRAPHENE QUANTUM DOTS AS ACTIVE INGREDIENT

(71) Applicant: SEOUL NATIONAL UNIVERSITY R&DB FOUNDATION, Seoul (KR)

(72) Inventors: Su Gyeong Jeong, Seoul (KR); Byung Hee Hong, Suwon-si (KR); Seo Yeon Kyung, Seoul (KR); Yong Seok Choi, Seoul (KR); Ju Hee Kim, Seoul (KR); Seok Kyun Yoon, Seongnam-si (KR); Hyeon Ju Yeo, Seongnam-si (KR); Seung Hyun Kang, Seoul (KR); Myeong Sam Park, Seoul (KR)

(73) Assignee: SEOUL NATIONAL UNIVERSITY R&DB FOUNDATION, Seoul (KR)

( * ) Notice: Subject to any disclaimer, the term of this patent is extended or adjusted under 35 U.S.C. 154(b) by 631 days.

(21) Appl. No.: 17/625,659

(22) PCT Filed: Jun. 9, 2020

(86) PCT No.: PCT/KR2020/007460
§ 371 (c)(1),
(2) Date: Jan. 7, 2022

(87) PCT Pub. No.: WO2021/006490
PCT Pub. Date: Jan. 14, 2021

(65) Prior Publication Data
US 2022/0273576 A1 Sep. 1, 2022

(30) Foreign Application Priority Data
Jul. 9, 2019 (KR) .................. 10-2019-0082791

(51) Int. Cl.
*A61K 9/19* (2006.01)
*A61K 8/31* (2006.01)
*A61K 33/44* (2006.01)
*A61Q 19/08* (2006.01)

(52) U.S. Cl.
CPC ............... *A61K 9/19* (2013.01); *A61K 8/31* (2013.01); *A61K 33/44* (2013.01); *A61Q 19/08* (2013.01); *A61K 2800/413* (2013.01); *A61K 2800/522* (2013.01); *A61K 2800/782* (2013.01)

(58) Field of Classification Search
CPC . A61K 9/19; A61K 8/31; A61K 33/44; A61K 2800/413; A61K 2800/522; A61K 2800/782; A61Q 19/08
See application file for complete search history.

(56) References Cited

U.S. PATENT DOCUMENTS

2016/0193249 A1    7/2016  Tour et al.

FOREIGN PATENT DOCUMENTS

| CN | 10667848 A | | 5/2017 | | |
| CN | 106667848 A | * | 5/2017 | ........... | A61K 8/0245 |
| CN | 106726645 A | * | 5/2017 | ............... | A61K 8/19 |
| JP | 2004168732 A | | 6/2004 | | |
| JP | 2013103908 A | | 5/2013 | | |
| JP | 2013151538 A | | 8/2013 | | |
| JP | 2016-529310 A | | 9/2016 | | |
| JP | 2017515814 A | | 6/2017 | | |
| KR | 10-2013-0134580 A | | 12/2013 | | |
| KR | 10-2015-0054186 A | | 5/2015 | | |
| KR | 20150054186 A | * | 5/2015 | | |
| KR | 10-2016-0146213 A | | 12/2016 | | |
| KR | 20190060492 A | | 6/2019 | | |
| WO | WO-2016199997 A1 | * | 12/2016 | ............... | A61K 8/19 |
| WO | 2018201157 A1 | | 11/2018 | | |

OTHER PUBLICATIONS

Ruiz et al.; Tuning the antioxidant activity of graphene quantum dots: Protective nanomaterials against dye decoloration; Elsevier; Carbon 116 (2017) 366-374 (Year: 2017).*
KR20150054186A machine translation (Year: 2015).*
WO2016199997A1 machine translation (Year: 2016).*
Vera-Sanchez et al.; "Silk-Fibroin and Graphene Oxide Composites Promote Human Periodontal Ligament Stem Cell Spontaneous Differentiation into Osteo/Cementoblast-Like Cells"; Mary Ann Liebert, Inc.; Stem Cells and Development, vol. 25, No. 22, 2016, 1742-1754 (Year: 2016).*
CN106667848A machine translation (Year: 2017).*
Machine translation of CN106726645A (Year: 2017).*
Ruiz, V. et al; "Tuning the antioxidant activity of graphene quantum dots: Protective nanomaterials against dye decoloration"; Carbon 116 (2017) pp. 366-374; http://dx.doi.org/10.1016/j.carbon.2017.01.090.
Yingming, Chang; "Informal Talks on Anti-age (Chinese Edition)"; China Medicine Science Press; First Edition; Nov. 1, 2017; 182 pages.
International Search Report from WIPO in Application No. PCT/2020/007460 dated Sep. 17, 2020.
Tian, P. et al., Graphene quantum dots from chemistry to applications, Materials today chemistry, 2018, vol. 10, pp. 221-258.

(Continued)

*Primary Examiner* — Robert A Wax
*Assistant Examiner* — John W Lippert, III
(74) *Attorney, Agent, or Firm* — DILWORTH IP, LLC (57) ABSTRACT

The present invention pertains to a cosmetic composition, quasi-drug composition and pharmaceutical composition containing graphene quantum dots as an active ingredient, and provides a composition that prevents skin aging by providing a skin regenerating, anti-wrinkle, moisturizing or antioxidant effect.

5 Claims, 5 Drawing Sheets

Specification includes a Sequence Listing.

(56) References Cited

OTHER PUBLICATIONS

Korean Office Action from priority KR Patent Application No. 10-2019-0082791, 5 pages.
Kumawat, Mukesh et al, Scientific Reports, 7, Article No. 15858, pp. 1-16, 2017.
Haghshenas, Marzie, et al. "Use of embryonic fibroblasts associated with graphene quantum dots for burn wound healing in Wistar rats." In Vitro Cellular & Developmental Biology-Animal 55 (2019): 312-322.

* cited by examiner

COSMETIC COMPOSITION CONTAINING GRAPHENE QUANTUM DOTS AS ACTIVE INGREDIENT

REFERENCE TO AN ELECTRONIC SEQUENCE LISTING

The contents of the electronic sequence listing (393-P0027US PX210087US Sequence Listing; Size 10,771 bytes; and date of Creation: Sep. 26, 2025) is herein incorporated by reference in its entirety.

TECHNICAL FIELD

The present invention relates to a skin regenerating, anti-wrinkle, moisturizing or antioxidant cosmetic composition, and particularly, to a skin regenerating, anti-wrinkle, moisturizing or antioxidant cosmetic composition containing graphene quantum dots as an active ingredient.

The present invention also relates to a skin regenerating, anti-wrinkle, moisturizing or antioxidant quasi-drug composition and pharmaceutical composition containing graphene quantum dots as an active ingredient.

SEQUENCE LISTING

The instant application contains a Sequence Listing which has been submitted via EFSWeb and is hereby incorporated by reference in its entirety. Said ASCII copy, created on Oct. 15, 2025, is named 393-P0027US_ST25, and is 3,104 bytes in size.

BACKGROUND ART

The skin of the body is responsible for protecting the body from various harmful agents while in direct contact with the external environment. Aging is a phenomenon that naturally progresses with age, and means that the original normal function of the body gradually declines physiologically as a result of a complex human body mechanism. Aging can be accelerated or retarded by various stimuli, but in modern society, it is accelerated due to internal and external agents such as ultraviolet rays, environmental pollutants, and stress.

The skin is broadly divided into three layers: epidermis, dermis, and hypodermis tissues in order from the outside. The skin functions to protect the human body from physical and chemical external environmental stimuli. Of these tissues, the epidermis is subdivided into the stratum corneum, stratum granulosum, stratum spinosum, and stratum basale. The stratum corneum has a water content of about 10 to 20%, exists in the outermost part of the human body, and functions to block the excessive penetration of external substances into the body while suppressing evaporation of water from the body. The stratum corneum surface is covered with a thin natural protective film made of sebum from the sebaceous glands and sweat from the sweat glands, and prevents evaporation of water. Meanwhile, the dermal layer functions to maintain skin elasticity and support the skin structure by synthesizing proteins, such as collagen, which serves as a support for the skin, and fibrillin which forms elasticity.

Aging of the skin occurs due to a lack of moisture in the stratum corneum or abnormalities in the extracellular matrix proteins of the dermal layer, and as aging progresses, symptoms appear in which the contents and arrangements of collagen, elastin, hyaluronic acid, and glycoprotein, which are substances constituting the skin, change or decrease.

High concentrations of natural moisturizing factors (NMFs), which are water-soluble components, exist in cells constituting the stratum corneum of the epidermis, and play a pivotal role in maintaining moisture in the stratum corneum. Natural moisturizing factors, such as amino acids and sugars, act to allow the skin to be flexible, and also help the skin maintain a proper moisture content. In particular, substances such as amino acids are not only water-soluble by themselves, but also effectively bind moisture, thus keeping the skin's moisture from evaporating. When the moisture content in the stratum corneum decreases, the skin becomes dry, the skin surface becomes rough, and the skin loses its gloss and looks dull. Because of these phenomenon, the need for skin moisturizers is increasing Aquaporins are transmembrane proteins (belonging to the major intrinsic protein family) that allow only water molecules to selectively pass through cell membranes and are present in all cell membranes, and these proteins increase water absorption of the skin. Aquaporins found in mammals are 13 homologous proteins (AQP-1 to AQP-13), of which aquaporin-3 (AQP-3) is abundantly present in the human epidermis. Aquaporin-3 is expressed in skin keratinocytes, and absorption and transport of water and glycerol through aquaporin-3 prevents the loss of cellular moisture and increases the moisture content and elasticity of the skin.

In addition, wrinkles, reduced skin elasticity, skin sagging and dryness, which appear in aged skin, are mostly caused by changes in matrix proteins present in the dermis. Since the dermis plays a role in supporting the strength and shape of the skin, it plays a decisive role in wrinkle formation and skin sagging when the morphological change of the dermis occurs as aging progresses. Representative enzymes that degrade these matrix proteins are matrix metalloproteinases (MMPs). When the skin is irradiated with ultraviolet light, the activities of MMPs in the skin increase, and these MMPs act as a major factor in accelerating skin aging by remarkably degrading collagen and other matrix proteins in the skin. Among them, MMP-1, also known as collagenase, is one of the enzymes that most affect the degradation of skin collagen. Thus, an active ingredient that inhibits MMP-1 has a good effect on preventing skin aging.

Accordingly, the present inventors have paid attention to graphene applicable to the biotechnology field, thereby completing the present invention. Graphene is a two-dimensional material which is a single atomic layer of sp2-bonded carbon atoms arranged in a hexagonal lattice structure. Since graphene was first discovered, various studies using the specific physical, chemical, electrical and mechanical properties of graphene have been conducted. In recent years, as the applicability of graphene-derived nanomaterials in the biotechnology has received attention, studies on the application of graphene-derived nanomaterials as biomaterials have been actively reported. As a conventional cosmetic composition containing graphene, a cosmetic composition having an enhanced UV absorption function by containing graphene quantum dots has been disclosed (KR 10-1710907B).

DISCLOSURE

Technical Problem

An object of the present invention is to provide skin regenerating, anti-wrinkle, moisturizing and antioxidant effects through a composition containing graphene quantum dots as an active ingredient.

Technical Solution

To achieve the above object, the present invention provides a cosmetic composition containing graphene quantum dots as an active ingredient.

The present invention also provides a cosmetic composition containing graphene quantum dots in an amount of $1.0 \times 10^{-7}$ to 30 wt % based on the total weight of the cosmetic composition.

The present invention also provides the cosmetic composition wherein the graphene quantum dots provide at least one effect selected from the group consisting of: i) scavenging reactive oxygen species; ii) inhibiting expression of collagenase (MMP-1); iii) promoting synthesis of type 1 procollagen; iv) increasing expression of fibrillin; v) increasing expression of hyaluronic acid synthase (HAS-3); and vi) increasing expression of aquaporin-3 (AQP-3).

The present invention also provides the cosmetic composition further containing at least one selected from the group consisting of powders, fatty substances, organic solvents, solubilizers, thickeners, gelling agents, emollients, antioxidants, suspending agents, stabilizers, foaming agents, fragrances, surfactants, water, ionic or nonionic emulsifiers, fillers, metal ion sequestering agents, chelating agents, preservatives, vitamins, blocking agents, wetting agents, essential oils, dyes, pigments, flavoring agents, and hydrophilic or lipophilic activators.

The present invention also provides the cosmetic composition which is at least one formulation selected from the group consisting of toners, lotions, and creams.

Another embodiment of the present invention provides a skin regenerating, anti-wrinkle, moisturizing or antioxidant quasi-drug composition containing graphene quantum dots as an active ingredient.

Still another embodiment of the present invention provides a skin regenerating, anti-wrinkle, moisturizing or antioxidant pharmaceutical composition containing graphene quantum dots as an active ingredient.

Advantageous Effects

The cosmetic composition, quasi-drug composition or pharmaceutical composition containing graphene quantum dots as an active ingredient according to the present invention exhibits skin regeneration, anti-wrinkle, moisturizing and antioxidant effects.

MODE FOR INVENTION

The present inventors have found that graphene quantum dots (GQDs) are not toxic to skin cells, and have the effect of promoting the regeneration of skin fibroblasts. In addition, the present inventors have found that graphene quantum dots exhibit the ability to scavenge reactive oxygen species generated in skin cells, inhibit expression of collagenase (MMP-1), and promote expression of COL1A1 and fibrillin, thereby exhibiting antioxidant and anti-wrinkle effects. In addition, the present inventors have found that graphene quantum dots increase expression of the hyaluronic acid synthase genes HAS-3 (Hyaluronan Synthase-3) and aquaporin-3 (AQP-3), which are skin moisturizing factors, thereby exhibiting moisturizing effects. As a result, the present invention provides a cosmetic composition containing, as an active ingredient, graphene quantum dots which exhibit an anti-aging effect through skin regenerating, antioxidant and moisturizing effects.

As used herein, "aging" refers to all the changes experienced by the skin with age (chronoaging) or through exposure to the sun (photoaging) or to environmental agents such as extreme climatic conditions, tobacco smoke, or chemical contaminants. Skin changes due to aging include all the external visible and/or perceptible changes through touch, or histological changes of skin tissue. Aging may be caused by various agents, and the cosmetic composition of the present invention can help anti-aging of the skin through skin regeneration, anti-wrinkle, moisturizing and antioxidant effects according to various mechanisms.

As used herein, "skin photoaging" refers to a phenomenon in which the skin is aged by exposure to sunlight (ultraviolet rays). Exposure to sunlight (ultraviolet rays) for a long period of time increases deep wrinkles on the face and neck and further renders the skin dry and rough, or causes pigmentations such as spots or freckles.

As used herein, the term "cells" refers to skin cells. Examples of the cells include keratinocytes and melanocytes, which are present in the epidermis, and fibroblasts which are present in the dermis and responsible for biosynthesis of collagen and elastin. The skin cells may preferably be fibroblasts.

As used herein, "skin anti-wrinkle" refers to maintaining or enhancing the wrinkle- and elasticity-related ability of the skin. Collagen and elastin, which are a collagen fiber and an elastic fiber, respectively, in the dermal layer of the skin, are major proteins that play this role and contribute to skin elasticity, and the biosynthesis of collagen in the skin is affected by internal and external factors. Specifically, the cellular activity of skin cells is reduced due to natural aging, a decrease in collagen fibers occurs, or reactive oxygen species produced by excessive irradiation with ultraviolet light as an external stimulus or by stress react with a thiol group (—SH) of a protein and inhibit enzyme activity or increase expression of enzymes degrading collagen and elastin, thus increasing skin wrinkles and decreasing skin elasticity, resulting in skin aging.

As used herein, the term "regenerating" means that the function of a damaged area is restored. For example, the regeneration includes a cell therapy method that allows the tissue of a damaged organ to function normally by supplying cells directly to the organ, and a method of helping function recovery by supplying an extracellular physiologically active substance.

As used herein, the term "antioxidant" means scavenging reactive oxygen species (ROS) that cause oxidative damage in the human body. Reactive oxygen species are considered as one of the main causes of aging because they are produced in large amounts upon ultraviolet light irradiation and cause damage to DNA, RNA, proteins, cell membranes and cell structures.

As used herein, the term "moisturizing" refers to preventing skin elasticity reduction, skin dryness and preventing the skin surface from being rough, by properly maintaining the moisture content of skin keratinocytes or the like.

As used herein, the term "graphene quantum dots (GQDs)" refers to a semiconductor material having a size of 10 nm or less, made from the conductive material graphene. In the present specification, the abbreviation "GQDs" is also used for the term "graphene quantum dots". Graphene quantum dots may exhibit excellent effects in many aspects due to their small size. Graphene-derived nanomaterials are easy to mass-synthesize, and the size, surface charge, etc. thereof may be changed through post-synthesis processing. In addition, graphene-derived nanomaterials have a large surface area, and have a lot of potential as biomaterials because other materials are easy to attach thereto, if necessary.

Hereinafter, the cosmetic composition will be described in more detail.

The cosmetic composition of the present invention is a skin regenerating, moisturizing or antioxidant cosmetic composition containing graphene quantum dots as an active ingredient.

The cosmetic composition of the present invention contains graphene quantum dots in an amount of $1.0 \times 10^{-7}$ to 30 wt % based on the total weight of the cosmetic composition. If the content of the graphene quantum dots as an active ingredient is less than $1.0 \times 10^{-7}$ wt %, the skin regeneration, moisturizing or antioxidant effect of the cosmetic composition will be insignificant, and if the content of the graphene quantum dots is more than 30 wt %, an increase in the content will not lead to a distinct increase in the effect.

The cosmetic composition of the present invention, which contains graphene quantum dots as an active ingredient, is not cytotoxic, and may be provided as a cosmetic composition exhibiting skin regenerating, anti-wrinkle, moisturizing or antioxidant effects, as demonstrated by treating skin cells with the cosmetic composition. Graphene quantum dots as an active ingredient of the cosmetic composition according to the present invention exhibit a skin antioxidant effect by effectively scavenging reactive oxygen species, particularly OH radicals, in fibroblasts, and exhibit an anti-wrinkle effect by promoting the regeneration of fibroblasts, inhibiting the expression of skin collagenase (MMP-1), and promoting the synthesis of type 1 procollagen and fibrillin. In addition, graphene quantum dots exhibit a moisturizing effect by promoting the expression of HAS-3 and/or AQP-3. Thus, the cosmetic composition may be usefully used as a cosmetic composition for preventing skin aging.

The cosmetic composition of the present invention may further contain at least one selected from the group consisting of powders, fatty substances, organic solvents, solubilizers, thickeners, gelling agents, emollients, antioxidants, suspending agents, stabilizers, foaming agents, fragrances, surfactants, water, ionic or nonionic emulsifiers, fillers, metal ion sequestering agents, chelating agents, preservatives, vitamins, blocking agents, wetting agents, essential oils, dyes, pigments, flavoring agents, and hydrophilic or lipophilic activators. Alternatively, the cosmetic composition of the present invention may further contain additives that are commonly used in the cosmetic or skin science field, such as any other ingredients commonly used in cosmetics. The additives are contained in amounts that are generally used in the cosmetic or skin science field. Furthermore, the composition of the present invention may contain a skin absorption-promoting material in order to increase the effects of improving skin conditions The cosmetic composition of the present invention may also be formulated in at least one selected from the group consisting of toners, lotions and creams, and the formulation is not particularly limited.

In another aspect, the present invention provides a skin regenerating, anti-wrinkle, moisturizing or antioxidant quasi-drug composition containing graphene quantum dots as an active ingredient. As used herein, the term "quasi-drug" refers to a product corresponding to any one selected from a textile product, a rubber product, or an analogue thereof used for the purpose of treatment, alleviation, handling, or prevention of human or animal diseases; a product which, not being a tool, a machine, or an analogue thereof, has minimal effects or does not have a direct effect on humans; and a preparation used for the purpose of disinfection, pest control, or a similar use thereof for the prevention of infectious diseases, which, among the products being used for the purpose of diagnosis, treatment, alleviation, handling, or prevention of human or animal diseases, excludes those which are not a tool, a machine, or a device; and which, among the products being used for the purpose of rendering a pharmacological effect on the human or animal structures and functions, excludes those which are not a tool, a machine, or a device.

When the composition of the present invention is used as a quasi-drug additive, the composition may be added as it is or may be used together with other quasi-drugs or quasi-drug components, and may be appropriately used according to a conventional method. The content of the active ingredient may be suitably determined according to the intended use.

The quasi-drug composition of the present invention may preferably be at least one formulation selected from the group consisting of body cleanser, disinfectant cleaners, cleaners, kitchen cleaners, cleaning agents, toothpaste, mouthwash, wet tissue, detergents, soap, hand wash, hair cleaners, hair softeners, humidifier fillers, masks, ointments, and filter fillers. The same contents as described above with respect to the cosmetic composition may be applied to the quasi-drug composition of the present invention, except for differences depending on the formulation.

In still another aspect, the present invention provides a skin regenerating, anti-wrinkle, moisturizing or antioxidant pharmaceutical composition containing graphene quantum dots as an active ingredient. The pharmaceutical composition of the present invention may further contain a pharmaceutically acceptable carrier, excipient or diluent. In addition, the pharmaceutical composition of the present invention may be administered orally or parenterally, and the dosage thereof may be appropriately selected depending on the subject's age, sex, body weight and condition, the severity of the disease, the form of drug, and the route and duration of administration.

Meanwhile, the method for producing differentiated skin cells according to one embodiment of the present invention includes steps of: forming differentiated cells by sub-culturing embryoid bodies derived from embryonic stem cells; culturing the differentiated cells while inhibiting the growth of the differentiated cells; and recovering a solution component from the step of culturing the differentiated cells.

Hereinafter, the present invention will be described in more detail with reference to examples. These examples serve merely to illustrate the present invention, and the scope of the present invention is not to be construed as being limited by these examples.

Example 1

Preparation Example 1: Production of Graphene Quantum Dots

Graphene quantum dots (GQDs) used in this experiment were produced with reference to Nat. Nanotech. 3, 812-818 (2018), which is a paper published in Nature Nanotechnology in 2018. Carbon fiber was added to a solution containing sulfuric acid and nitric acid at a volume ratio of 3:1, and then heated with stirring at 80° C. for 24 hours. Then, the acids were removed, and the residue was purified by vacuum filtration and dried to obtain graphene quantum dots in powder form. The graphene quantum dots thus obtained can have various sizes of 20 nm or less. The graphene quantum dots used in this experiment had a size of about 3 nm The graphene quantum dot powder obtained as described above was dispersed in Dulbecco's phosphate buffered saline (DPBS) at various concentrations for use in evaluation of the effects of thereof on cells in Experimental Examples 1 to 7 below.

Experimental Example 1: Evaluation of Cytotoxicity

To evaluate the cytotoxicity of the graphene quantum dots of Example 1, a change in the number of human dermal fibroblasts (Hs68) was measured. Cells treated with epigallocatechin gallate (EGCG) were used as a positive control group.

First, Hs68 fibroblasts were dispensed into a 96-well plate at a density of $2 \times 10^4$ cells per well, and then cultured in an incubator at 37° C. under 5% $CO_2$ for 24 hours. Next, the medium was replaced with each of a medium (None) containing no graphene quantum dots (GQDs) and a medium containing graphene quantum dots at each of 100 ng/mL, 1,000 ng/mL, $1 \times 10^4$ ng/mL and $1 \times 10^5$ ng/mL, and then the cells were additionally cultured for 24 hours. After 24 hours, the medium was removed from each well, and the cells were washed once with Dulbecco's phosphate buffered saline (DPBS), and then incubated with a fresh containing 10 μl of CCK-8 (cell counting kit-8, Dojindo, Japan) reagent in each well at 37° C. for 4 hours. Then, the absorbance at 450 nm was measured using a UV-Vis spectrophotometer. Cell viability was expressed as a percentage relative to the average absorbance value of the control group treated with the medium containing no GQDs.

Figure 1:
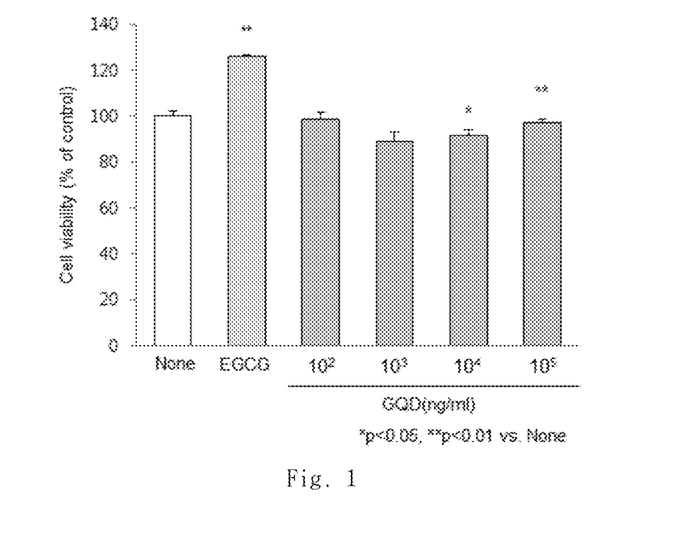
FIG. 1 is a graph showing that when fibroblasts were treated with graphene quantum dots (GQDs) at each of 100 ng/mL, 1,000 ng/mL and $1 \times 10^4$ ng/mL, $1 \times 10^5$ ng/mL, the graphene quantum dots did not adversely affect the activity of the cells.

As a result, as shown in FIG. 1, it was confirmed that treatment with GQDs did not inhibit cell proliferation and had the effect of promoting cell proliferation. Thereby, it was confirmed that GQDs were not cytotoxic even when the skin cells were treated with GQDs at a concentration of $1 \times 10^5$ ng/mL or more.

Experimental Example 2: Evaluation of Antioxidant Effect

Figure 2:
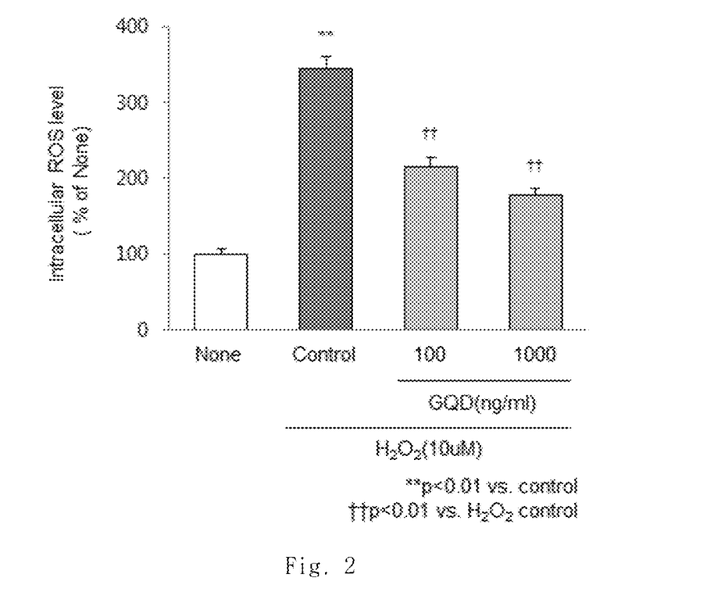
FIG. 2 is a graph showing scavenging of $H_2O_2$-induced intracellular reactive oxygen species when fibroblasts were treated with graphene quantum dots at each of 100 ng/mL and 1,000 ng/mL.

The antioxidant activity of DOQs was measured by determining the production of reactive oxygen species (ROS) using DCF-DA which fluoresces in response to reactive oxygen species (ROS) produced in cells. Hs68 fibroblasts were dispensed into a 6-well plate at a density of $3.5 \times 10^5$ cells per well, and then cultured in an incubator at 37° C. under 5% $CO_2$ for 24 hours. Next, the medium was removed, DPBS was added to the cells, and then $H_2O_2$ was added to the cell groups other than the control group, followed by additional culture for 24 hours. Then, under a light-shielded condition, the cells were stained with DCF-DA (10 μM) at 37° C. for 1 hour. Thereafter, the medium was removed, and then the cells were washed twice with DPBS, 1 ml of DPBS was added to each well, and the cells were scraped with a cell scraper and collected in an EP tube. A 200 μl aliquot of the cell solution collected as described above was added three times to each well of a 96-well black plate, and then the plate was read with Victor 3 at Ex/Em=485/535 nm. Intracellular ROS level was calculated relative to that of the untreated group (None) by using Equation 1 below, and the results are shown in FIG. 2.

Intracellular ROS (%)={(OD of group treated with UV light and sample–OD of group not treated with UV light)/OD of group not treated with UV light}×100     [Equation 1]

(wherein OD (Optical Density) means absorbance unit.)

As a result, it was confirmed in the DCF-DA assay that GQDs had an antioxidant effect against intracellular ROS at GQD treatment concentrations of 100 ng/mL and 1,000 ng/mL.

Experimental Example 3: Evaluation of the Ability to Scavenge Intracellular OH Radicals The ability of graphene quantum dots (GQDs) to scavenge OH radicals was evaluated by adding an OH580 probe that fluoresces by selective binding to OH radicals in living cells. Hs68 fibroblasts were dispensed into a 96-well plate at a density of $2 \times 10^4$ cells per well and then cultured in an incubator at 37° C. under 5% $CO_2$ for 24 hours. Next, the plate was centrifuged at 800 rpm for 2 minutes, and then the medium was removed, and each well was treated with 100 μl of an OH580 stain working solution (Abcam, Massachusetts, USA), and then covered with a foil and incubated at 37° C. under 5% $CO_2$ for 1 hour. Next, the cells were treated with $H_2O_2$ (100 μM)+GQDs at each of 10, 100 and 1,000 ng/ml in DPBS, and then incubated at 37° C. under 5% $CO_2$ for 2 hours. Thereafter, the solution was removed, and each well was washed 2 or 3 times with DPBS, and then 100 μL of assay buffer was added to each well which was then observed with a fluorescence microscope at a wavelength of 594 nm.

Figure 3:
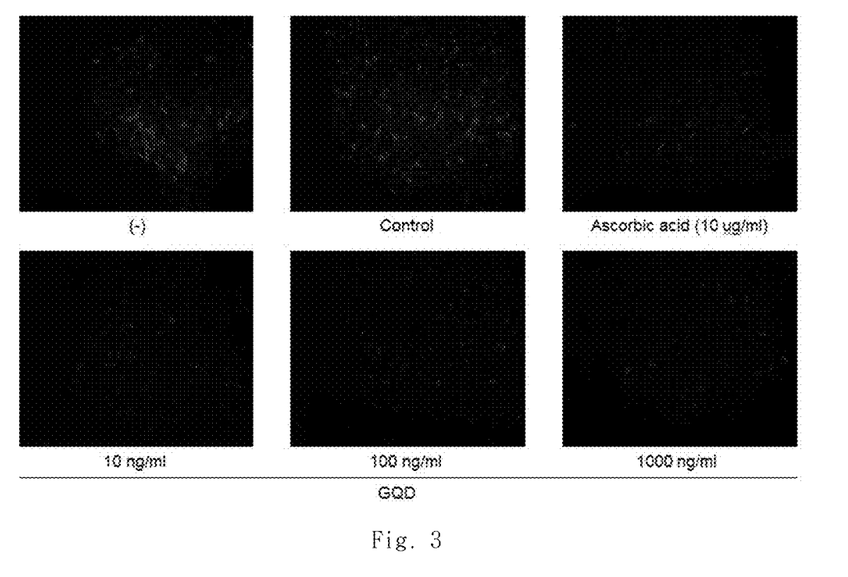
FIG. 3 depicts fluorescence images showing scavenging of OH radicals among $H_2O_2$-induced reactive oxygen species when fibroblasts were treated with graphene quantum dots at 10 ng/mL, 100 ng/mL and 1,000 ng/mL.

As a result of observing the ability of GQDs to scavenge $H_2O_2$-induced OH radicals in the fibroblasts with the fluorescence microscope, as shown in FIG. 3, it was confirmed that treatment with GQDs at a concentration of 10 ng/mL, 100 ng/mL or 1,000 ng/mL had significant antioxidant activity compared to the control.

Experimental Example 4: Evaluation of the Ability to Promote Cell Regeneration

To evaluate the cell regeneration promoting effect of graphene quantum dots (GQDs), an experiment was conducted using the same cells used in Experimental Examples 1 and 2. Cells treated with ascorbic acid were used as a positive control group.

Hs68 fibroblasts were dispensed into a 6-well plate at a density of $5 \times 10^5$ cells/well, and then cultured in an incubator 37° C. under 5% $CO_2$ for 24 hours to reach a confluence of 100%. Next, the cells were gently scratched with a pipette tip across the center of the well to create a wound, and the medium was replaced with each of a medium containing no GQDs and a medium containing GQDs at each of 10 ng/mL, 100 ng/mL and 1,000 ng/mL, followed by additional culture for 24 hours. After 24 hours, in the case of the cells not treated with GQDs and the case of the cells treated with GQDs, the degree of recovery from the wound created in the cells was observed under a microscope.

Figure 4A:
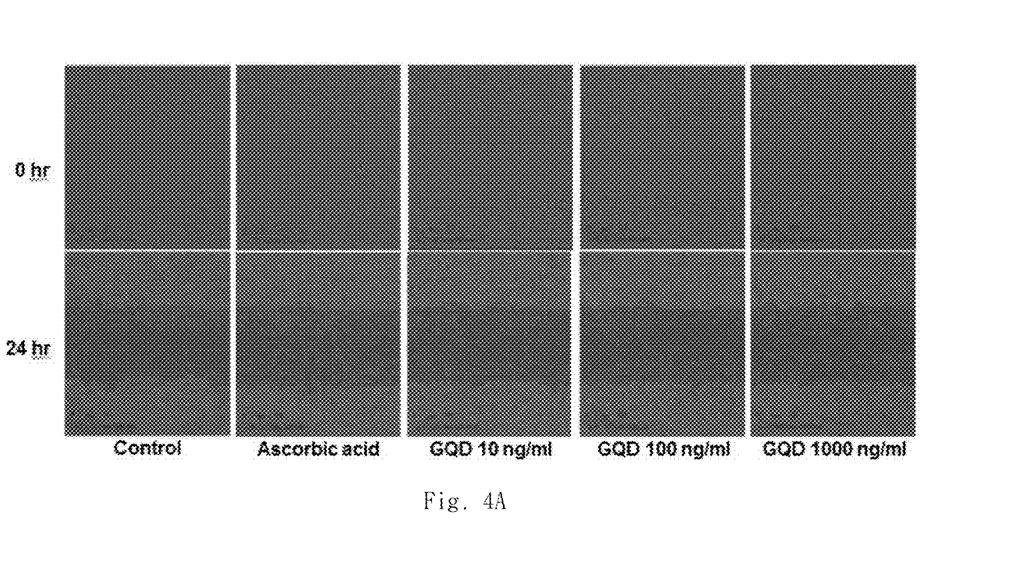
FIG. 4A and FIG. 4B depict images showing the fibroblast regeneration promoting effects of graphene quantum dots with increasing concentration when fibroblasts were treated with graphene quantum dots at 10 ng/mL, 100 ng/mL and 1,000 ng/mL.
Figure 4B:
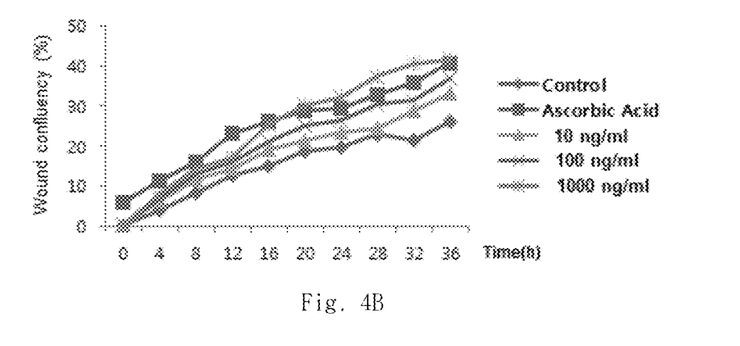

As a result, as shown in FIG. 4, it was confirmed that cell regeneration was more promoted in the cells treated with GQDs than in the cells not treated with GQDs.

Experimental Example 5: Evaluation of the Ability to Inhibit MMP-1

To evaluate the inhibitory ability of graphene quantum dots (GQDs) against collagenase (MMP-1) that is increased by ultraviolet light, the expression level of MMP-1 in human Hs68 fibroblasts was measured. Hs68 fibroblasts were dispensed into a 6-well plate at a density of $3 \times 10^5$ cells per well, and then cultured in an incubator at 37° C. under 5% $CO_2$ for 24 hours. Next, the medium was removed, DPBS was added, and then the cell groups other than the non-UVB-irradiated group were irradiated with UVB at a dose of 12 $mJ/cm^2$. Then, various concentrations of GQDs were added to the cells, followed by additional culture for 24 hours. Thereafter, RNA was isolated from the cells, treated with each sample, by using TRIzol (RNAiso, DAKARA, Japan), and then quantified by Nanodrop at 260 nm. Then, cDNA was synthesized from 2 μg of the RNA in an amplifier (C1000 Thermal Cycler, Bio-Rad, USA). Finally, the expression level of the MMP-1 gene was evaluated by performing real-time polymerase chain reaction (PCR) in a real-time PCR machine using a mixture obtained by adding the target protein MMP-1 primer and the cyanine dye SYBR Green (SYBR Green Supermix, Applied Biosystems, USA) to the synthesized cDNA. The primer sequences and the PCR reaction conditions are shown in Table 1 below, and the expression level of the gene was finally analyzed by normalization to the β-actin gene.

TABLE 1

| Primer | | Sequence | SEQ ID NOs: | Reaction conditions |
|---|---|---|---|---|
| MMP-1 | F | 5'-CGAATTGCCGACAGAGATGA-3' | 1 | Polymerase |
|  | R | 5'-GTCCCTGAACAGCCCAGTACTT-3' | 2 | activation |
| COL1A1 | F | 5'-GAGGGCCAAGACGAAGACATC-3' | 3 | at 94° C. for |
|  | R | 5'-CAGATCACGTCATCGCACAAC-3' | 4 | 5 min, |
| FBN1 | F | 5'-AATGTCAGACGAAGCCAGGG-3' | 5 | followed by |
|  | R | 5'-GATTTGGTGACGGGGTTCCT-3' | 6 | polymerase |
| HAS3 | F | 5'-CTTAAGGGTTGCTTGCTTGC-3' | 7 | chain |
|  | R | 5'-GTTCGTGGGAGATGAAGGAA-3' | 8 | reaction for |
| AQP3 | F | 5'-GTCACTCTGGGCATCCTCAT-3' | 9 | 40 cycles, |
|  | R | 5'-CTATTCCAGCACCCAAGAAGG-3' | 10 | each |
| β-actin | F | 5'-GGCCATCTCTTGCTCGAAGT-3' | 11 | consisting |
|  | R | 5'-GAGACCTTCAACACCCCAGC-3' | 12 | of 95° C. for 30 sec, 55° C. for 30 sec, and 72° C. for 30 sec |

Figure 5:
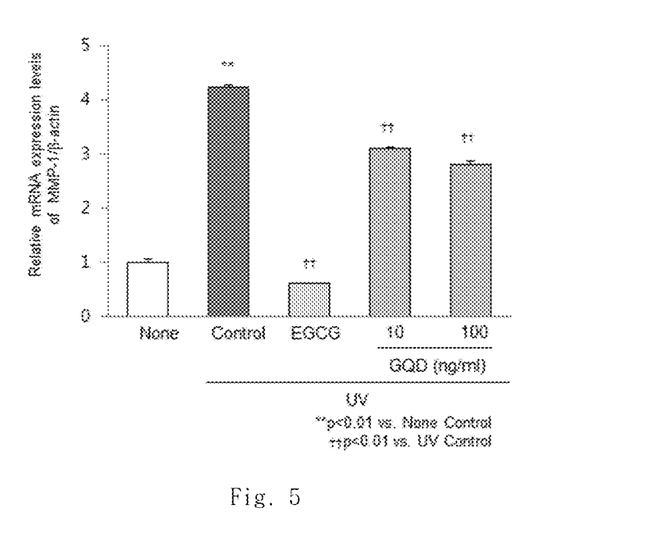
FIG. 5 is a graph showing the results of measuring the effect of graphene quantum dots on the inhibition of MMP-1 expression that increased due to UV irradiation.

As a result, as shown in FIG. 5, it was confirmed that the expression level of MMP-1 increased rapidly in the UVB-irradiated group, but decreased in the GQD-treated group.

Experimental Example 6: Anti-Winkle Effect

Whether the antioxidant effects confirmed from the results in FIGS. 2 and 3 increase the production of collagen, which plays an important role in wrinkles on human skin, was measured in the following manner. Human fibroblasts were seeded into a 6-well cell culture dish at a density of $4 \times 10^5$ cells per well, and then cultured in an incubator at 37° C. under 5% $CO_2$ for 24 hours. The cells were irradiated with UVB at a dose of 12 $mJ/cm^2$, and then treated with various concentrations of GQDs and further cultured for 24 hours. Thereafter, RNA was isolated from the cells, treated with each sample, by using TRIzol (RNAiso, DAKARA, Japan), and then quantified by Nanodrop at 260 nm. Then, cDNA was synthesized from 2 μg of the RNA in an amplifier (C1000 Thermal Cycler, Bio-Rad, USA). Finally, the expression level of the type 1 procollagen gene was evaluated by performing real-time polymerase chain reaction (PCR) in a real-time PCR machine using a mixture obtained by adding the target protein procollagen primer and the cyanine dye SYBR Green to the synthesized cDNA. The expression of the gene was finally analyzed by normalization to the R-actin gene.

Figure 6:
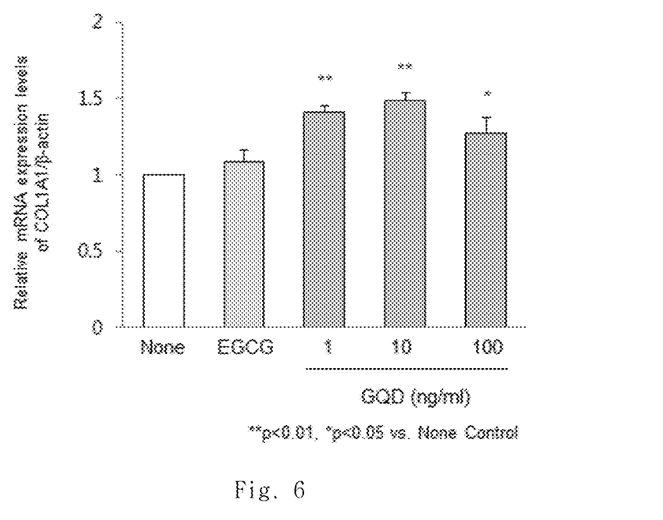
FIG. 6 is a graph showing the effect of treatment with graphene quantum dots on the promotion of expression of collagen synthetic enzyme COL1A1.
Figure 7:
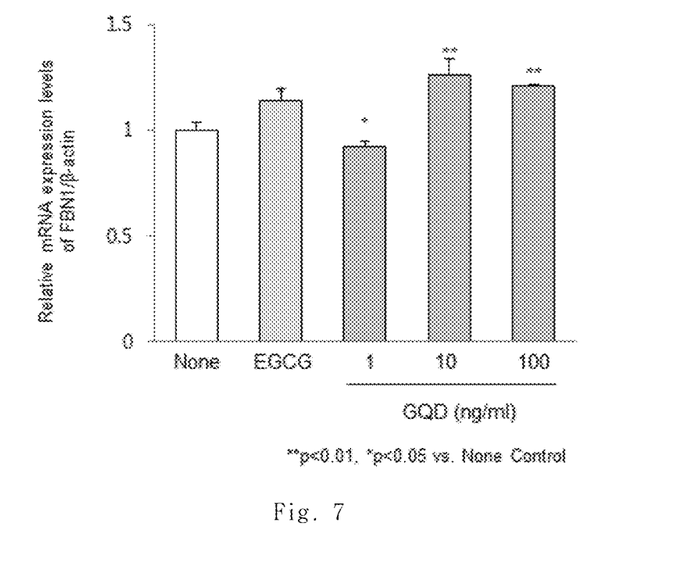
FIG. 7 is a graph showing the effect of treatment with graphene quantum dots on the promotion of expression of fibrillin.

As a result, as shown in FIG. 6, it was confirmed that, when the skin cells were treated with GQDs, the production of type 1 procollagen increased. In addition, as shown in FIG. 7, it was confirmed that treatment with GQDs promoted fibrillin expression. Thereby, it was confirmed that graphene quantum dots could exhibit a skin elasticity improvement effect and an anti-wrinkle effect.

Experimental Example 7: Moisturizing Effect

In order to evaluate the moisturizing effect of graphene quantum dots (GQDs), the expression levels of hyaluronic acid synthases in human fibroblasts were evaluated by measuring the expression of hyaluronic acid synthase-3 (HAS-3) and aquaporin-3 (AQP-3) genes.

Cells were dispensed into a 6-well plate, cultured for 24 hours, and then washed with phosphate buffered saline (PBS). GQDs in FBS-free DMEM were added to each well at concentrations of 10 ng/mL, 100 ng/mL and 1,000 ng/mL.

Figure 8:
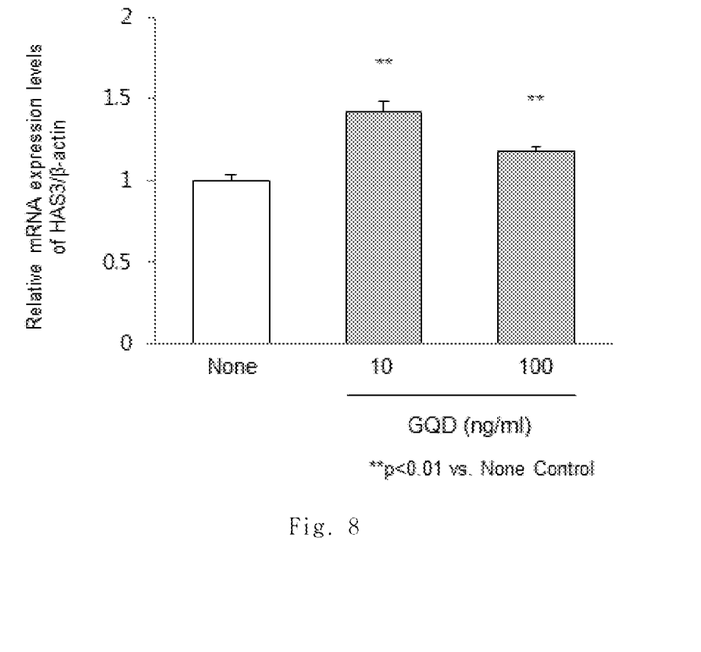
FIG. 8 is a graph showing the effect of treatment with graphene quantum dots on the promotion of expression of the hyaluronic acid synthase HAS-3.
Figure 9:
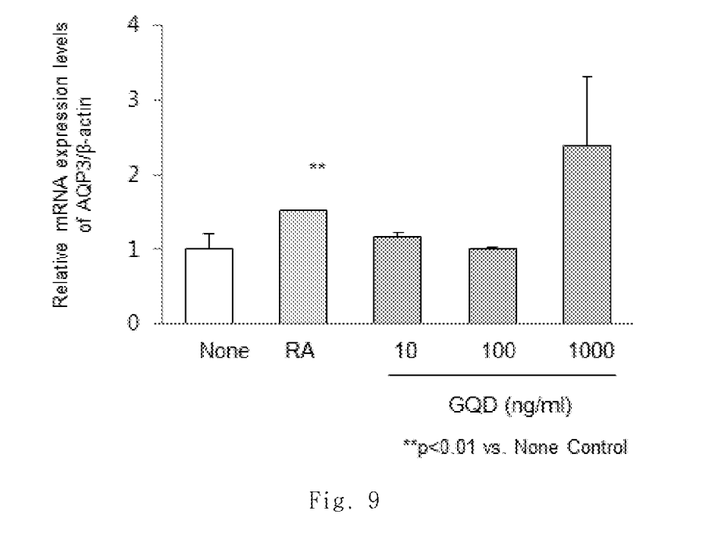
FIG. 9 is a graph showing the effect of treatment with graphene quantum dots on the promotion of expression of aquaporin-3 (AQP-3).

As a result, as shown in FIGS. 8 and 9, it was confirmed that increases in expression of HAS-3 (FIG. 8) and AQP-3 (FIG. 9) were more promoted in the cells treated with GQDs than in the group not treated with GQDs. Thereby, it could be confirmed that GQDs had a skin moisturizing effect.

Example 2

Preparation Example 2: Preparation of Cosmetic Compositions Containing Graphene Quantum Dots (1) Preparation of Toner As a cosmetic composition containing graphene quantum dots, a toner was prepared using the components and contents shown in Table 2 below according to a conventional method.

TABLE 2

| Component | Content (wt %) |
| --- | --- |
| Graphene quantum dots | 1.0 |
| Glycerin | 3.0 |
| Butylene glycol | 2.0 |
| Polyoxyethylene (60) hydrogenated castor oil | 0.5 |
| Polysorbate 80 | 0.5 |
| Ethanol | 10.0 |
| Preservative | q.s. |
| Fragrance | q.s. |
| Purified water | To 100 |

(2) Preparation of Lotion

As a cosmetic composition containing graphene quantum dots, a lotion was prepared using the components and contents shown in Table 3 below according to a conventional method.

TABLE 3

| Component | Content (wt %) |
| --- | --- |
| Graphene quantum dots | 1.0 |
| Glycerin | 7.0 |
| Butylene glycol | 3.0 |
| Glyceryl stearate/PEG-100 stearate | 1.0 |
| Polysorbate 60 | 0.5 |
| Sorbitan sesquioleate | 0.5 |
| Squalene | 3.0 |
| Caprylic/capric triglycerides | 5.0 |
| Shea butter | 2.0 |
| Stearyl alcohol | 0.5 |
| Stearic acid | 0.5 |
| Carboxyvinyl polymer | 0.2 |
| Arginine | 0.2 |
| Preservative | q.s. |
| Fragrance | q.s. |
| Purified water | To 100 |

(2) Preparation of Cream

As a cosmetic composition containing graphene quantum dots, a cream was prepared using the components and contents shown in Table 4 below according to a conventional method.

TABLE 4

| Component | Content (wt %) |
| --- | --- |
| Graphene quantum dots | 1.0 |
| Glycerin | 7.0 |
| Butylene glycol | 5.0 |
| Glyceryl stearate/PEG-100 stearate | 2.0 |
| Polysorbate 60 | 0.5 |
| Sorbitan stearate | 0.5 |
| Phytosqualane | 5.0 |
| Jojoba oil | 3.0 |
| Caprylic/capric triglycerides | 10.0 |
| Aloe butter | 3.0 |
| Beeswax | 1.0 |
| Stearyl alcohol | 0.5 |
| Behenyl alcohol | 0.5 |
| Stearic acid | 0.5 |
| Carboxyvinyl polymer | 0.2 |
| Arginine | 0.3 |
| Dimethicone | 0.5 |
| Preservative | q.s. |
| Fragrance | q.s. |
| Purified water | To 100 |

The invention claimed is:

1. A skin regenerating and anti-wrinkle cosmetic composition containing graphene quantum dots as an active ingredient, wherein the graphene quantum dots are contained in an amount of $1.0 \times 10^{-7}$ to 30 wt % based on the total weight of the cosmetic composition, and wherein the graphene quantum dots provide at least one effect selected from the group consisting of: i) inhibiting expression of collagenase (MMP-1); ii) promoting synthesis of type 1 procollagen; and iii) increasing expression of fibrillin.

2. The cosmetic composition of claim 1, further containing at least one selected from the group consisting of powders, fatty substances, organic solvents, solubilizers, thickeners, gelling agents, emollients, antioxidants, suspending agents, stabilizers, foaming agents, fragrances, surfactants, water, ionic or nonionic emulsifiers, fillers, metal ion sequestering agents, chelating agents, preservatives, vitamins, blocking agents, wetting agents, essential oils, dyes, pigments, flavoring agents, and hydrophilic or lipophilic activators.

3. The cosmetic composition of claim 1, which is at least one formulation selected from the group consisting of toners, lotions, and creams.

4. A skin regenerating and anti-wrinkle quasi-drug composition containing graphene quantum dots as an active ingredient.

5. A skin regenerating and anti-wrinkle pharmaceutical composition containing graphene quantum dots as an active ingredient.

* * * * *

```
SEQUENCE LISTING

<160> NUMBER OF SEQ ID NOS: 12

<210> SEQ ID NO 1
<211> LENGTH: 20
<212> TYPE: DNA
<213> ORGANISM: Artificial sequence
<220> FEATURE:
<223> OTHER INFORMATION: The sequence is artificially synthesized

<400> SEQUENCE: 1
cgaattgccg acagagatga                                              20

<210> SEQ ID NO 2
<211> LENGTH: 22
<212> TYPE: DNA
<213> ORGANISM: Artificial sequence
<220> FEATURE:
```

<223> OTHER INFORMATION: The sequence is artificially synthesized

<400> SEQUENCE: 2
gtccctgaac agcccagtac tt                                            22

<210> SEQ ID NO 3
<211> LENGTH: 21
<212> TYPE: DNA
<213> ORGANISM: Artificial sequence
<220> FEATURE:
<223> OTHER INFORMATION: The sequence is artificially synthesized

<400> SEQUENCE: 3
gagggccaag acgaagacat c                                             21

<210> SEQ ID NO 4
<211> LENGTH: 21
<212> TYPE: DNA
<213> ORGANISM: Artificial sequence
<220> FEATURE:
<223> OTHER INFORMATION: The sequence is artificially synthesized

<400> SEQUENCE: 4
cagatcacgt catcgcacaa c                                             21

<210> SEQ ID NO 5
<211> LENGTH: 20
<212> TYPE: DNA
<213> ORGANISM: Artificial sequence
<220> FEATURE:
<223> OTHER INFORMATION: The sequence is artificially synthesized

<400> SEQUENCE: 5
aatgtcagac gaagccaggg                                               20

<210> SEQ ID NO 6
<211> LENGTH: 20
<212> TYPE: DNA
<213> ORGANISM: Artificial sequence
<220> FEATURE:
<223> OTHER INFORMATION: The sequence is artificially synthesized

<400> SEQUENCE: 6
gatttggtga cggggttcct                                               20

<210> SEQ ID NO 7
<211> LENGTH: 20
<212> TYPE: DNA
<213> ORGANISM: Artificial sequence
<220> FEATURE:
<223> OTHER INFORMATION: The sequence is artificially synthesized

<400> SEQUENCE: 7
cttaagggtt gcttgcttgc                                               20

<210> SEQ ID NO 8
<211> LENGTH: 20
<212> TYPE: DNA
<213> ORGANISM: Artificial sequence
<220> FEATURE:
<223> OTHER INFORMATION: The sequence is artificially synthesized

<400> SEQUENCE: 8
gttcgtggga gatgaaggaa                                               20

```
<210> SEQ ID NO 9
<211> LENGTH: 20
<212> TYPE: DNA
<213> ORGANISM: Artificial sequence
<220> FEATURE:
<223> OTHER INFORMATION: The sequence is artificially synthesized

<400> SEQUENCE: 9
gtcactctgg gcatcctcat                                          20

<210> SEQ ID NO 10
<211> LENGTH: 21
<212> TYPE: DNA
<213> ORGANISM: Artificial sequence
<220> FEATURE:
<223> OTHER INFORMATION: The sequence is artificially synthesized

<400> SEQUENCE: 10
ctattccagc acccaagaag g                                        21

<210> SEQ ID NO 11
<211> LENGTH: 20
<212> TYPE: DNA
<213> ORGANISM: Artificial sequence
<220> FEATURE:
<223> OTHER INFORMATION: The sequence is artificially synthesized

<400> SEQUENCE: 11
ggccatctct tgctcgaagt                                          20

<210> SEQ ID NO 12
<211> LENGTH: 20
<212> TYPE: DNA
<213> ORGANISM: Artificial sequence
<220> FEATURE:
<223> OTHER INFORMATION: The sequence is artificially synthesized

<400> SEQUENCE: 12
gagaccttca cacccccagc                                          20
```